US 8,428,755 B2

(12) United States Patent
Salsbury

(10) Patent No.: US 8,428,755 B2
(45) Date of Patent: Apr. 23, 2013

(54) SYSTEMS AND METHODS FOR INCREASING FEEDBACK CONTROLLER RESPONSE TIMES

(75) Inventor: Timothy Salsbury, Whitefish Bay, WI (US)

(73) Assignee: Johnson Controls Technology Company, Holland, MI (US)

( * ) Notice: Subject to any disclaimer, the term of this patent is extended or adjusted under 35 U.S.C. 154(b) by 358 days.

(21) Appl. No.: 12/697,896

(22) Filed: Feb. 1, 2010

(65) Prior Publication Data

US 2011/0190909 A1    Aug. 4, 2011

(51) Int. Cl.
G05B 13/02     (2006.01)
(52) U.S. Cl.
USPC .................... 700/41; 700/42; 700/46
(58) Field of Classification Search .............. 700/9, 28, 700/29, 31, 37, 40, 41, 42, 44, 45, 52, 275, 700/276, 46
See application file for complete search history.

(56) References Cited

U.S. PATENT DOCUMENTS

| | | | | |
|---|---|---|---|---|
| 4,903,192 A | * | 2/1990 | Saito et al. | 700/37 |
| 5,223,778 A | * | 6/1993 | Svarovsky et al. | 700/42 |
| 5,355,305 A | | 10/1994 | Seem et al. | |
| 5,406,496 A | * | 4/1995 | Quinn | 700/41 |
| 5,535,117 A | * | 7/1996 | Hiroi | 700/37 |
| 5,748,467 A | * | 5/1998 | Qin et al. | 700/50 |
| 5,796,608 A | * | 8/1998 | Bunzemeier | 700/37 |
| 6,122,605 A | | 9/2000 | Drees et al. | |
| 6,369,716 B1 | | 4/2002 | Abbas et al. | |
| 6,389,331 B1 | | 5/2002 | Jensen et al. | |
| 6,408,228 B1 | | 6/2002 | Seem et al. | |
| 6,415,617 B1 | | 7/2002 | Seem | |
| 6,540,148 B1 | | 4/2003 | Salsbury et al. | |
| 6,594,554 B1 | | 7/2003 | Seem et al. | |
| 6,647,318 B2 | | 11/2003 | Salsbury | |
| 6,816,811 B2 | | 11/2004 | Seem | |
| 6,862,540 B1 | | 3/2005 | Welch et al. | |
| 6,937,909 B2 | | 8/2005 | Seem | |
| 7,024,254 B2 | | 4/2006 | Salsbury et al. | |
| 7,024,336 B2 | | 4/2006 | Salsbury et al. | |
| 7,031,880 B1 | | 4/2006 | Seem et al. | |
| 7,124,637 B2 | | 10/2006 | Singhal et al. | |
| 7,289,936 B2 | | 10/2007 | Singhal et al. | |
| 7,496,472 B2 | | 2/2009 | Seem | |
| 7,505,877 B2 | | 3/2009 | Salsbury | |
| 7,542,876 B2 | | 6/2009 | Singhal et al. | |
| 7,603,186 B2 | * | 10/2009 | Smirnov | 700/37 |
| 7,949,415 B2 | * | 5/2011 | Chia et al. | 700/29 |
| 8,115,441 B2 | * | 2/2012 | Romenesko et al. | 318/727 |
| 2002/0116075 A1 | | 8/2002 | Salsbury | |
| 2003/0101009 A1 | | 5/2003 | Seem | |
| 2003/0153986 A1 | | 8/2003 | Salsbury et al. | |
| 2004/0215356 A1 | | 10/2004 | Salsbury et al. | |
| 2005/0004685 A1 | | 1/2005 | Seem | |
| 2005/0204818 A1 | | 9/2005 | Singhal et al. | |
| 2005/0256661 A1 | | 11/2005 | Salsbury et al. | |
| 2005/0284160 A1 | | 12/2005 | Singhal et al. | |
| 2007/0185686 A1 | | 8/2007 | Singhal et al. | |

(Continued)

*Primary Examiner* — Charles Kasenge
(74) *Attorney, Agent, or Firm* — Foley & Lardner LLP

(57) ABSTRACT

A device for adjusting a signal normally provided by a proportional plus integral (PI) control module to a process system includes a processing circuit configured to modify the signal of the PI control module by exaggerating the rate of change of the signal and an output for providing the modified signal to the process system.

13 Claims, 7 Drawing Sheets

U.S. PATENT DOCUMENTS

| | | |
|---|---|---|
| 2007/0262741 A1 | 11/2007 | Singhal et al. |
| 2007/0276545 A1* | 11/2007 | Smirnov .................. 700/282 |
| 2008/0179408 A1 | 7/2008 | Seem |
| 2008/0179409 A1 | 7/2008 | Seem |
| 2008/0183424 A1 | 7/2008 | Seem |
| 2008/0231437 A1 | 9/2008 | Singhal et al. |
| 2008/0255814 A1* | 10/2008 | Chia et al. .................. 703/6 |
| 2008/0277486 A1 | 11/2008 | Seem et al. |
| 2008/0281439 A1 | 11/2008 | Salsbury |
| 2008/0294291 A1 | 11/2008 | Salsbury |
| 2009/0021208 A1* | 1/2009 | Romenesko et al. ......... 318/807 |
| 2009/0033513 A1 | 2/2009 | Salsbury et al. |
| 2009/0065596 A1 | 3/2009 | Seem et al. |
| 2009/0083583 A1 | 3/2009 | Seem et al. |
| 2010/0138004 A1* | 6/2010 | Chia et al. .................. 700/29 |

* cited by examiner

SYSTEMS AND METHODS FOR INCREASING FEEDBACK CONTROLLER RESPONSE TIMES

BACKGROUND

The present disclosure generally relates to the field of feedback controllers.

Feedback controllers are used to control variable devices such as valves, pumps, and dampers in control systems or processes. The object of such controllers is to control the device in a way that maintains a controlled variable (e.g., temperature, humidity, flow rate, pressure, etc.) at a desired setpoint. Many feedback controllers respond to feedback based on one or more control parameters. A common control parameter used in feedback algorithms is proportional gain (i.e., the proportional term, the gain, etc.)—a value that is used by a feedback algorithm to determine the magnitude of the adjustment to the controlled signal given the error signal. For example, when provided the same error signal, a feedback algorithm with a high gain generally results in a large adjustment to the controlled signal while a small gain generally results in a small adjustment to the controlled signal. In addition to the proportional gain an integral term is often used by feedback algorithms (e.g., in proportional plus integral (PI) control algorithms, in proportional-integral-derivative (PID) control algorithms, etc.).

In dynamic systems (e.g., where conditions outside of the control loop are affecting the controlled variable or where an aspect of the control loop is variably imperfect), the optimal control parameters for the feedback algorithm are often also dynamic. Accordingly, some feedback controllers or feedback algorithms are periodically tuned (e.g., manually, automatically) based on observed historical behavior of the system. Other feedback controllers or feedback algorithms include adaptive tuning algorithms that automatically adjust the control parameters during normal operation of the feedback algorithm. Such adaptive tuning algorithms can provide for improved performance relative to tuning algorithms that run only periodically.

Pattern recognition adaptive controllers (PRAC) define one class of adaptive tuning controllers. PRAC controllers and various improvements thereto are described in, e.g., U.S. Pat. Nos. 5,355,305 and 6,937,909. With PRAC, parameters that characterize the pattern of the closed-loop response are determined after significant setpoint changes or load disturbances have occurred. The control parameters for the feedback controller are then adjusted based upon the determined pattern characteristics.

The Applicant has observed sluggish behavior from process systems having a pattern recognition adaptive controller if the control loop has high levels of non-linearity and time-varying behavior (which causes the PRAC controller to tune more conservatively over time).

SUMMARY

One embodiment relates to a device for adjusting a signal normally provided by a proportional plus integral (PI) feedback control module to a process system. The system includes an input interface configured to receive the signal from the PI feedback control module. The system further includes a processing circuit configured to modify the signal of the PI feedback control module by exaggerating the rate of change of the signal. The system yet further includes an output interface for providing control signals to the process system. The processing circuit is further configured to provide the modified signal to the output interface.

Another embodiment relates to a method for adjusting a signal normally provided from a proportional plus integral (PI) controller to a process system. The method includes receiving the signal from the PI controller. The method also includes modifying the signal from the PI controller by exaggerating the rate of change of the signal. The method further includes providing the modified signal to the process system.

Another embodiment relates to a control system for a plant. The control system includes a feedback controller configured to calculate a control signal for the plant based on a feedback signal. The control system further includes a compensator configured to intercept the control signal, to modify the control signal by exaggerating the rate of change of the control signal, and to provide the modified control signal to the plant.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, a device for adjusting a signal normally provided by a proportional plus integral (PI) control module to a process system is shown, according to an exemplary embodiment. The system includes a processing circuit configured to modify the signal of the PI controller by exaggerating the rate of change of the signal and an output for providing the modified signal to the process system.

Figure 1:
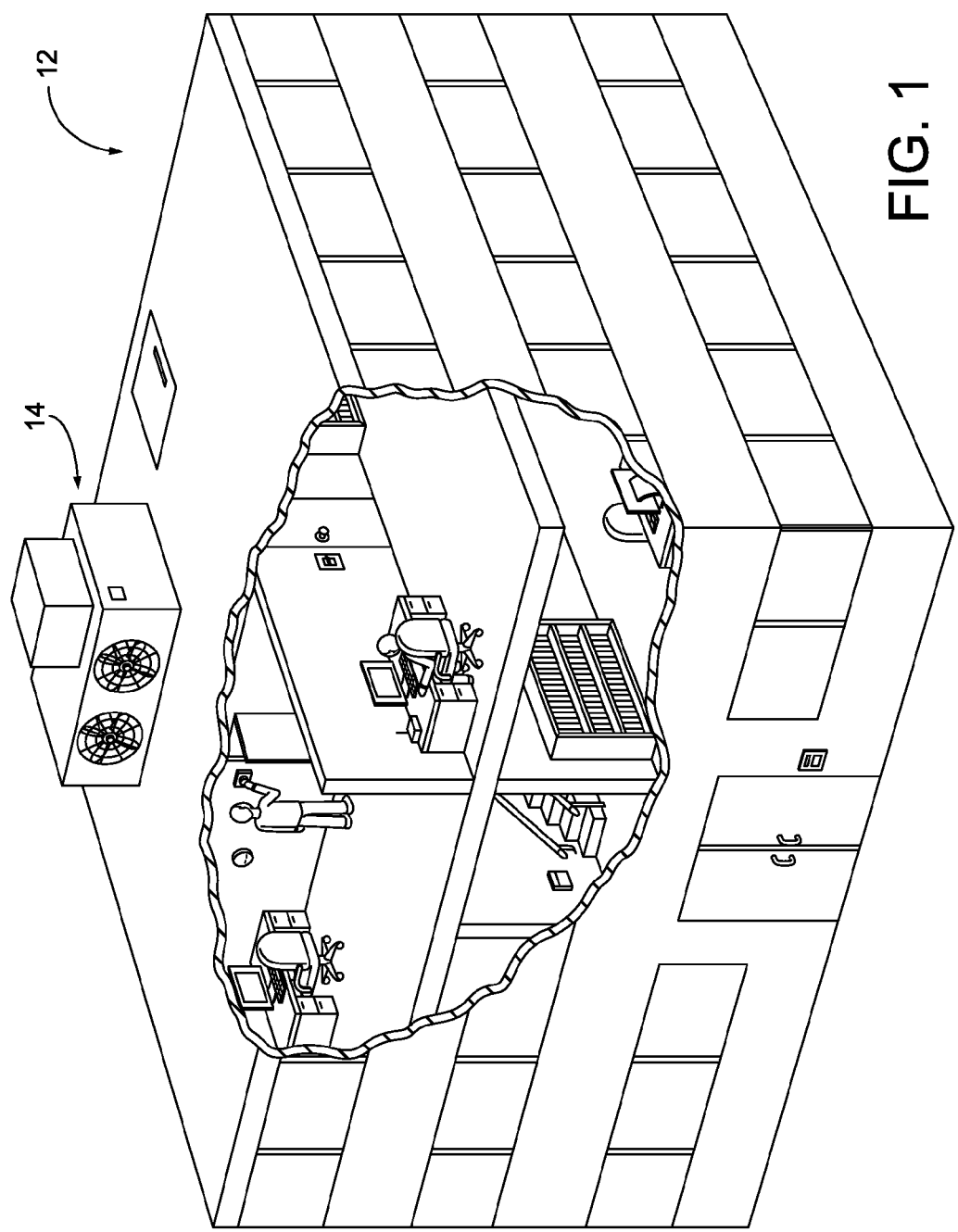
FIG. 1 is a perspective view of a building, according to an exemplary embodiment.

Referring now to FIG. 1, a perspective view of a building 12 is shown. The building includes a number of floors, rooms, spaces, zones, and/or other building structures and areas. According to various exemplary embodiments, building 12 may be any area of any size or type, including an outdoor area. The systems, devices, control modules and methods of the present disclosure may be implemented in building 12 and in building systems serving building 12 (e.g., a rooftop air handing unit 14, a controller thereof, a control loop for adjusting the amount of ventilation provided to a building space, etc.).

Figure 2:
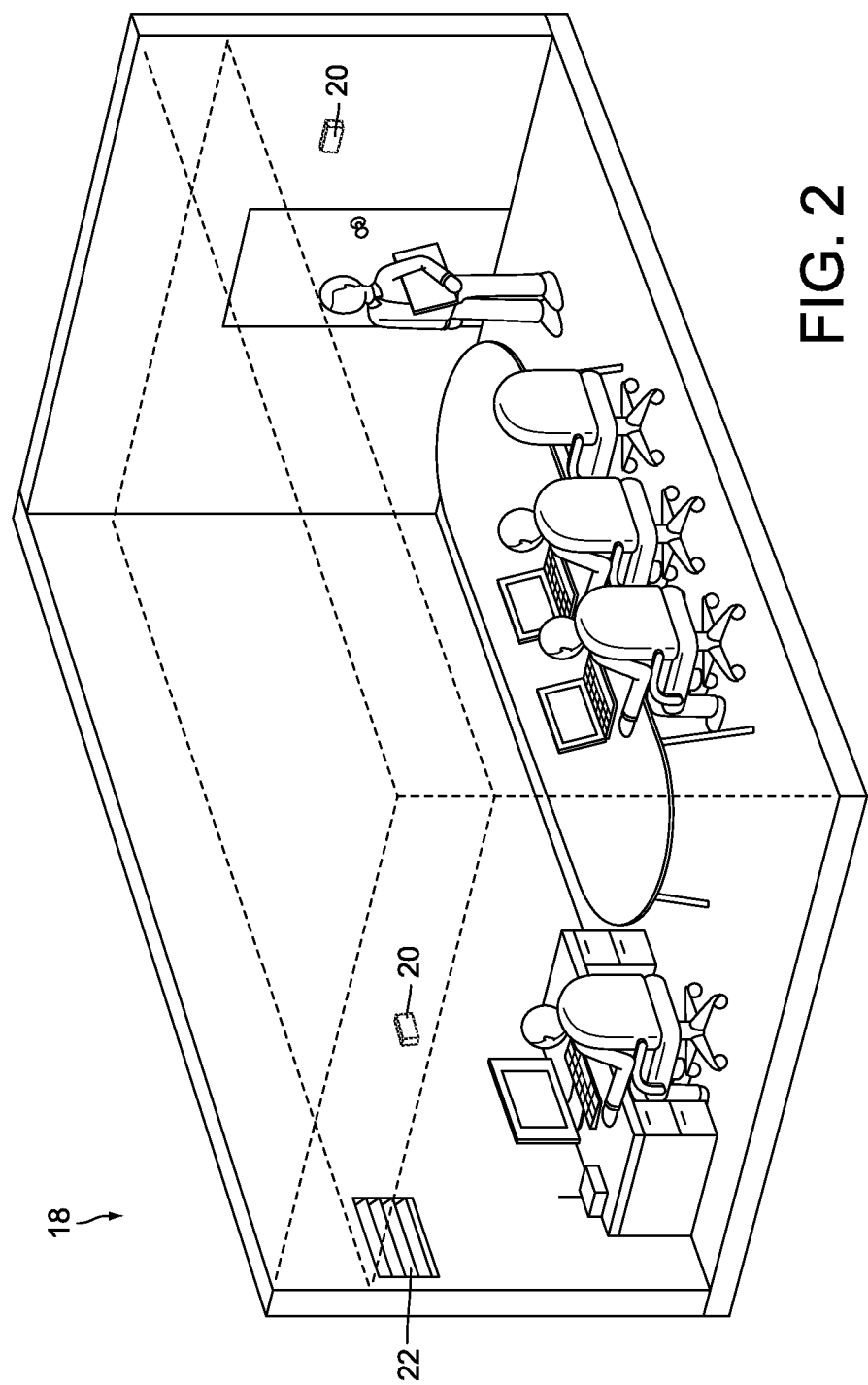
FIG. 2 is a close-up perspective view of a building zone of the building of FIG. 1, according to an exemplary embodiment.

Referring to FIG. 2, a close-up perspective view of a building zone 18 of building 12 of FIG. 1 is shown, according to an exemplary embodiment. Building zone 18 includes a heating, ventilation, and air conditioning (HVAC) vent 22 coupled to ductwork. Supply air flow or ventilation is provided to zone 18 via vent 22. A variable air volume (VAV) box such as that shown in FIGS. 3 and 4 can be used to control the amount of warm or cool air allowed into the room via vent 22. Sensors 20 are disposed within and/or around building zone 18 and are configured to sense conditions within building zone 18. For example, sensors 20 can be temperature sensors, humidity sensors, air quality sensors, or any other type of sensor that may be configured to sense a building-related condition. Sensors 20 are shown disposed on the walls of building zone 18, but may be located, positioned, or disposed in any manner or location within building zone 18. Sensors 20 can be wireless or wired sensors configured to operate on or with any network topology.

While the systems and methods of the present disclosure are described with reference to temperature regulation systems including a VAV box, it should be appreciated that any process system or plant (e.g., mechanical equipment used to affect a controlled variable), and any control loop thereof, may be modified to include the systems and methods of the present disclosure.

Figure 3:
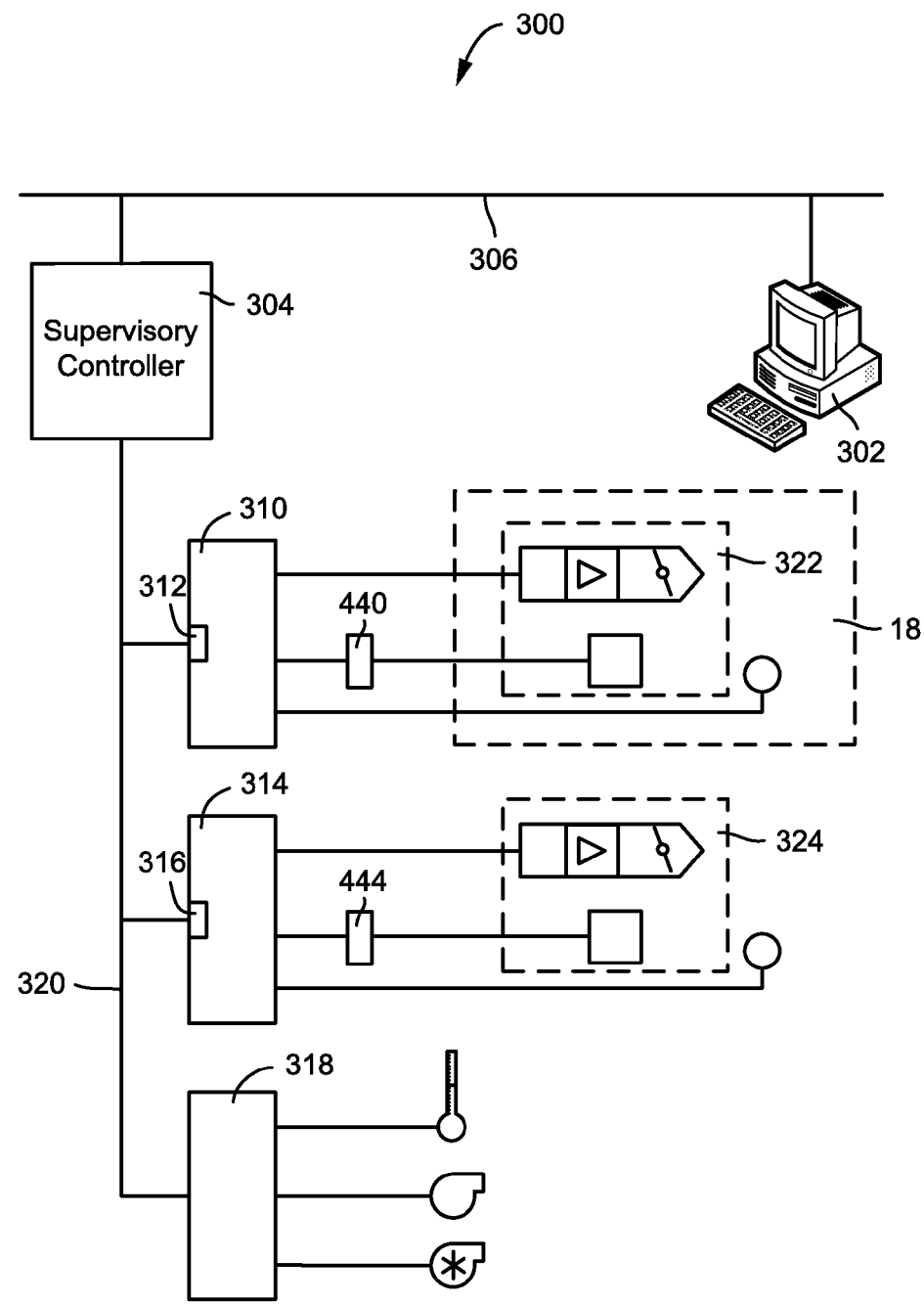
FIG. 3 is a schematic block diagram of a control system for the building zone of FIG. 2, according to an exemplary embodiment.

Referring to FIG. 3, a schematic block diagram of a climate control system 300 is shown, according to an exemplary embodiment. Climate control system 300 is used to control a controlled variable of a building zone (e.g., a climate condition of the building zone, a temperature, an oxygen level, an air pollutant level, a humidity level, etc.), according to an exemplary embodiment. Climate control system 300 is shown to include a workstation 302, a supervisory controller 304, and a plurality of controllers 310, 314, and 318, according to an exemplary embodiment. Controllers 310, 314, and 318 are coupled to supervisory controller 304 which may provide dynamically changing setpoints to controllers 310, 314, and 318 via communication link 320 (e.g., a building network, a wireless network, a wired network, separate communication links, etc.). Controllers 310 and 314 are shown to include communication ports 312 and 316 for coupling to communication link 320. Workstation 302 and supervisory controller 304 are shown as communicably coupled via communication bus 306 (e.g., in-building network, wireless network, an IP network, etc.). Communication bus 306 and communication link 320 can be coupled to additional sections and additional controllers, as well as any other components, systems, or devices. According to one exemplary embodiment, climate control system 300 is a building automation system such as a METASYS system sold by Johnson Controls, Inc. In such an embodiment, supervisory controller 304 may be a Network Automation Engine (NAE) device sold by Johnson Controls.

Figure 4:
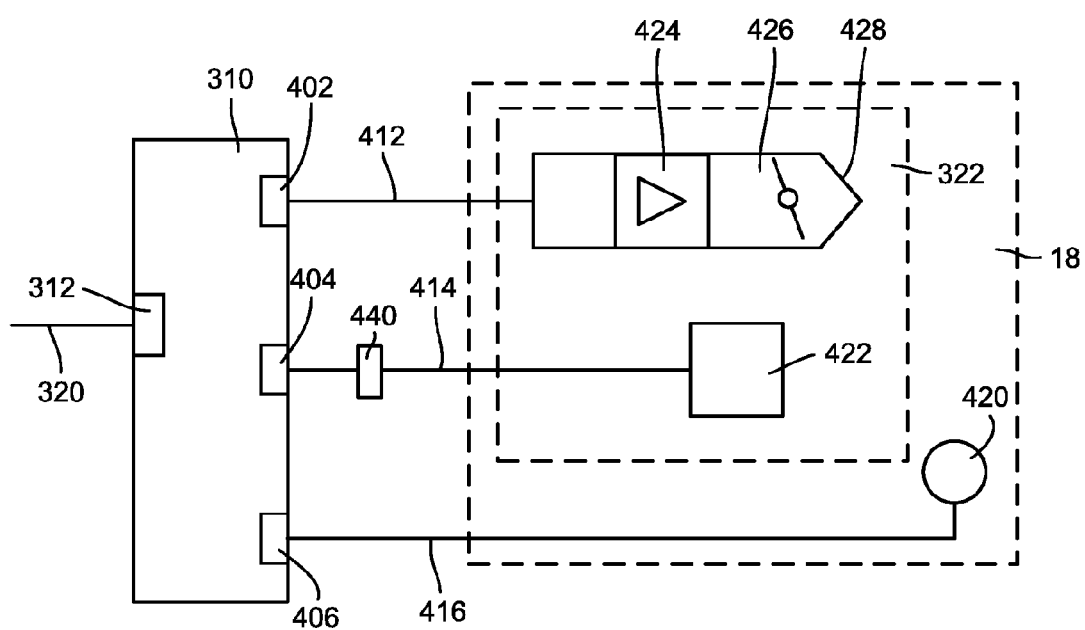
FIG. 4 is a schematic block diagram of a controller and variable air volume box of the control system of FIG. 3, according to an exemplary embodiment.

Referring to FIGS. 3 and 4, controller 310 is shown as communicably connected to VAV box 322 (e.g., a VAV box of zone 18 of FIG. 2) and controller 314 is shown as communicably connected to VAV box 324. In FIG. 4, VAV box 322 is shown to include a damper 426, an air flow sensor 424, and an actuator 422. Actuator 422 positions damper 426 based on signals provided to it from controller 310 via control line 414 and actuator output 404. The position of damper 426 controls the amount of air flow (e.g., sensed by air flow sensor 428) provided to the building zone (e.g., a room, hallway, building, a portion thereof, or other internal environment). Controller 310 receives a temperature signal from a temperature sensor 420 via control line 416 at temperature input 406. In an exemplary embodiment, controller 310 is configured to appropriately position actuator 422 in accordance with a control algorithm.

In an exemplary embodiment, the control algorithm that controls the actuator 422 is or includes an integral (I) based algorithm, a proportional (P) algorithm, or a proportional integral (PI) algorithm. In other exemplary embodiments, the control algorithm is another feedback logic control algorithm. In accordance with many embodiments of the algorithm, at every cycle controller 310 receives, for example, the temperature value at input 406 and provides an actuator control signal at actuator output 404 to position damper 426 in a manner that is calculated to bring the controlled variable (e.g., the temperature value) closer to the setpoint. Controller 310 can also cyclically respond to the air flow value. According to various exemplary embodiments, the system can utilize temperature, humidity, flow rate, pressure, or any other available input to assist in calculating an optimal actuator position. Regardless of the number or types of variables used in the algorithm, however, the algorithm may be configured to primarily use feedback of a controlled variable (e.g., actual room temperature) relative to a setpoint (e.g., target temperature) to determine new control signals (e.g., new position control signals for actuator 422) for the process system.

According to various exemplary embodiments, temperature sensor 420 can be a resistive sensor located in a building environment or any other type of temperature sensor. Actuator 422 may be an electric motor-based actuator, a pneumatic actuator, a hydraulic actuator, or any other type of device for controlling and positioning damper 426. VAV box 322 may additionally include fans, heating or cooling units, exhaust dampers, and return dampers for treating an air flow. Interfaces 402 and 406 can be or include analog inputs or can be or include digital inputs. Controller 310 can include circuitry and/or software for transforming, conditioning or interpreting the signals on inputs 402 and 406. For example, controller 310 may include an A/D converter configured to transform analog input signals into digital information for processing. Air flow sensor 424 provides a parameter such as an air flow parameter via link 412 to air flow input 402. The air flow parameter can represent the amount of air flow provided through damper 426 to an environment. Air flow sensor 424 can a differential pressure sensor which provides a factor related to air flow (volume/unit time). Air flow sensor 424 and its output can be used by controller 310 in its control algorithm to optimally reach a setpoint.

The control signal provided to actuator 422 may be a pulse width signal which causes actuator 422 to rotate, move forward, move backward, or to stay in the same position, and controller 310 may internally keep track of the position of actuator 422 as it is moved. Alternatively, actuator 422 may provide feedback indicative of its position, or the actuator signal may indicate the particular position to which actuator 422 should be moved.

While the systems and methods of the present disclosure and more specifically FIGS. 2-4 are primarily described with reference to temperature regulation systems including a VAV box, it should be appreciated that any process system or plant (e.g., mechanical equipment used to affect a controlled variable) and any control loop thereof may be modified to include the systems and/or methods of the present disclosure. For example, in another exemplary embodiment, the systems and methods of the present disclosure can be utilized with air handling units (AHUs). These AHUs may have water-to-air heat exchangers for providing heating and cooling to an air stream. The flow of water through the coils is regulated by a hydronic valve, which is moved by an electric actuator connected to a controller. The valve position is adjusted to maintain the air temperature at the output of the heat exchangers within a specific range (i.e., setpoint).

Referring still to FIGS. 3-4, a compensator 440 is provided downstream of controller 310 to increase controller 310's response times and to remove sluggish behavior that can exist in some control loops (e.g., PRAC-PI loops, etc.). Compensator 440 is shown as receiving controller 310's output for actuator 422. Compensator 440 is configured to modify the output received from controller 310 by exaggerating the rate of change of the signal. Compensator 440 then provides the modified signal to actuator 422. As mentioned above, some controllers that utilize PRAC-PI or other adaptive tuning algorithms can have slower responses to load or environmental disturbances than users find satisfactory. Compensator 440 modifies the controller 310 output before it is passed to actuator 422.

In an exemplary embodiment, compensator 440 modifies the signal using a zero-dominant transfer function that is configured to make forward-looking predictions to speed up responses provided to actuator 422. Compensator 440 makes the forward-looking predictions by modifying the signal from the feedback controller to exaggerate the rate of change of the signal. Compensator 440 includes analog or digital circuitry for receiving the signal from the feedback controller and for filtering or transforming the signal to complete the modification. One s-domain transfer function for such an exemplary compensator 440 is:

$$P(s) = \frac{\tau s + 1}{0.1 \tau s + 1}$$

where $\tau$ is compensator 440's time constant.

The z-domain representation of the above s-domain transfer function is:

$$P(z) = K \frac{z - e^{\frac{-\Delta t}{\tau}}}{z - e^{\frac{-10\Delta t}{\tau}}}$$

where $$K = \frac{1 - e^{\frac{-10\Delta t}{\tau}}}{1 - e^{\frac{-\Delta t}{\tau}}}$$

and where $\Delta t$ is the sampling period of the filter. Hence, using this transfer function, compensator 440 could be implemented in a digital controller or in software using the following equations:

$$\lambda = \exp(-\Delta t / \tau)$$

$$u'_k = \lambda^{10} u'_{k-1} + \frac{1 - \lambda^{10}}{1 - \lambda}(u_k - \lambda u_{k-1})$$

where $0 \leq \lambda \leq 1$ and the feedback controller's normal output is $0 \leq u \leq 1$. The compensator's output is $u_k'$, where $0 \leq u_k' \leq 1$. When $\lambda$ is zero the equation passes through the input without modification. As $\lambda$ increases from zero to one, the loop will become more sensitive to disturbances. The digital controller implementation includes circuitry for converting analog to digital or otherwise preparing the digital frames.

Compensator time constant $\tau$ may advantageously be adjusted to remove some of the dynamics of the process system (e.g., by more aggressively controlling the process system during a period coinciding with the time constant of the press system). For example, the process system shown in FIG. 4 may have a time constant on the order of ten minutes (i.e., the sensor 420 might have a time constant of nearly ten minutes). The effect of this delay may be reduced by setting the compensator time constant $\tau$ to have a time constant of ten minutes or less. If the compensator's sampling period $\Delta t$ is set to one second, the value for $\lambda$ in the digital controller example listed above would be 0.99 (i.e., $\lambda = \exp(-1/600)$).

Figure 5:
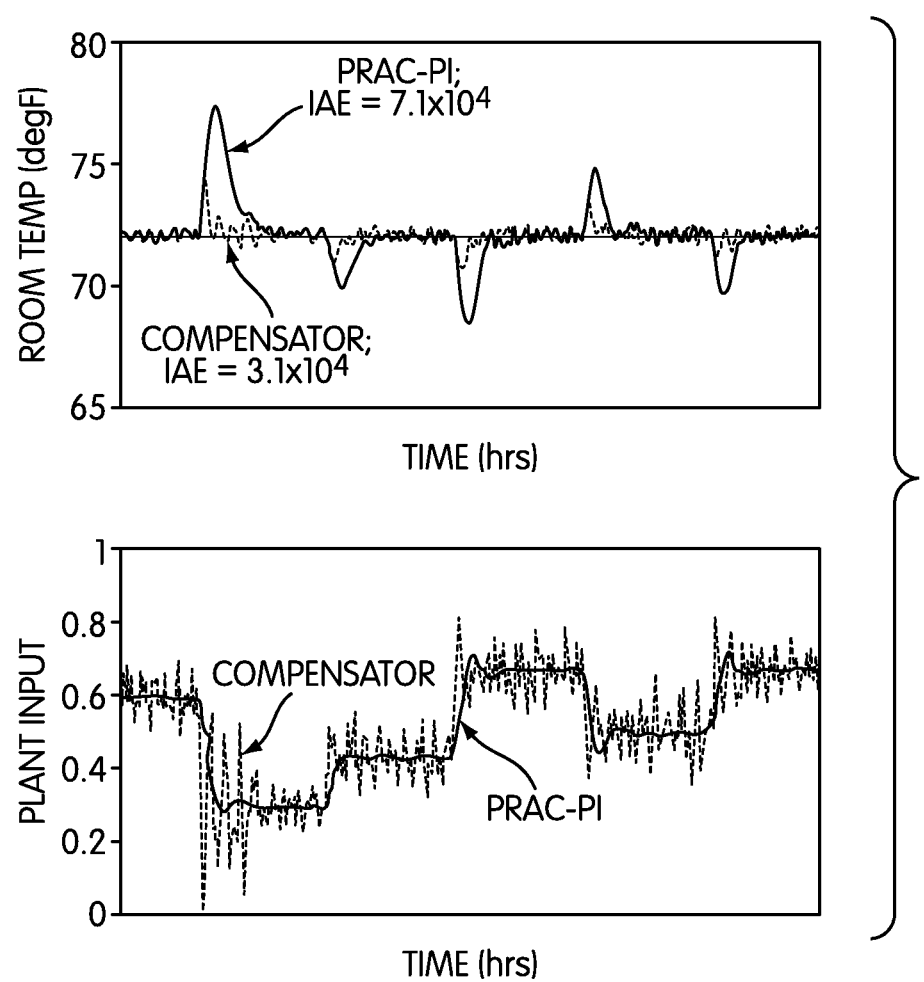
FIG. 5 is a graph illustrating the modification of a PRAC-PI controller's control signal using a compensator of the present application.

FIG. 5 shows an example simulation comparing a standard PRAC-PI controller and a PRAC-PI controller coupled to a compensator as described herein. The simulated room temperature is 72 deg F. and is subject to simulated load changes that cause the measured value to move away from the setpoint. The controllers (the PRAC-PI and the PRAC-PI with Compensator) try to return the temperature back to setpoint. As can be seen from the top graph of FIG. 5, the compensator adjusted process system resulted in a reduced simulated integrated absolute error (IAE) (more than 50% lower) and significantly reduced the amount of time that temperature was held well above or below the setpoint. The bottom graph of FIG. 5 shows the movement of the controller output for both cases. The compensator assisted control strategy trades some instability (illustrated in the bottom graph) for the faster response to disturbances (illustrated in the top graph).

In one exemplary embodiment, $\tau$ is user-adjustable. In other exemplary embodiments the value for $\tau$ is based on an input value for the process system's time constant. For example, in one embodiment $\tau$ may be set to an input process system's time constant divided by two. Some embodiments for automatically adjusting $\tau$ or $\lambda$ are described below with reference to FIG. 6C and dynamics adjustment module 708 in particular.

Figure 6A:
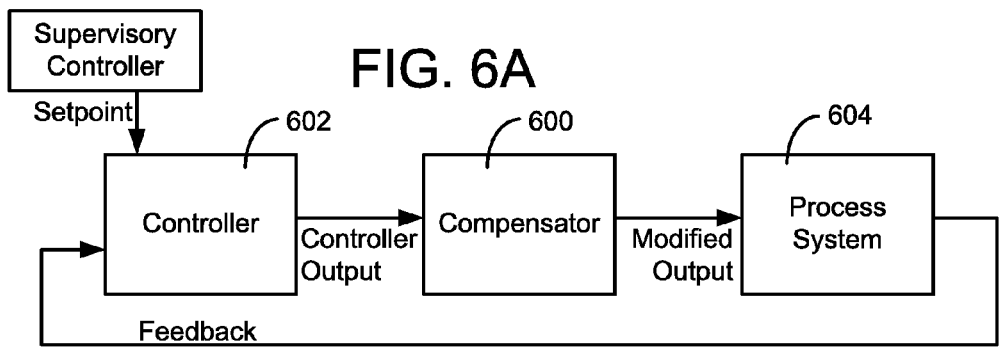
FIGS. 6A-6D are block diagrams of different control systems having compensators or compensation modules according to various exemplary embodiments of the present disclosure.

Referring now to FIGS. 6A-6D, various exemplary embodiments of feedback-based control loops having a compensator of the present disclosure are shown. In FIG. 6A, compensator 600 is physically separate from controller 602 and process system 604. FIG. 6A may be a simplified schematic diagram of the control system shown in FIG. 4. Compensator 600 receives controller 602's output, modifies the signal to exaggerate the rate of change of the signal, and provides the modified output to process system 604. In the embodiment shown in FIG. 6A, controller 602 may be left unmodified. Compensator 600 may be embodied within its own housing (e.g., a housing surrounding circuitry for implementing the compensator) and may include a hardware input for physically connecting to a wire from controller 602 and a hardware output for physically connecting to a wire output for process system 604.

Figure 6B:
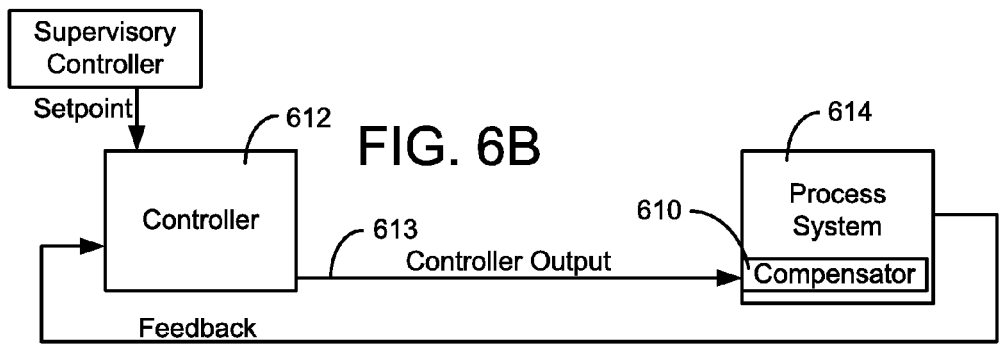

In FIG. 6B, compensator 610 is shown as integrated with process system 614. For example, compensator 610 may be integrated with a local controller for an actuator of process system 614. Controller output 613 from controller 612 meant for process system 614 may be received by the stock input for process system 614 in some embodiments. In other embodiments controller output 613 may be fed directly into compensator 610 and compensator 610's output may be provided to the stock input for process system 614.

Figure 6C:
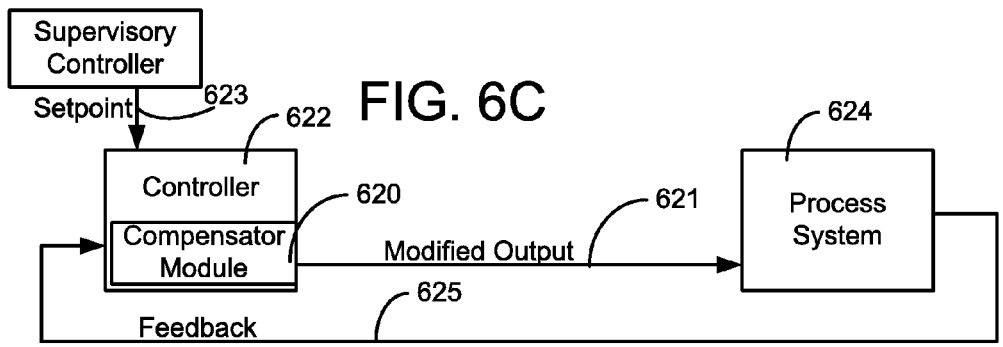

In FIG. 6C, a compensator module 620 is shown as integrated with controller 622. Controller 622's control logic behaves normally but its output is provided to compensator module 620 prior to leaving controller 622 for process system 624. Compensator module 620 is described in greater detail in the description referring to FIG. 7.

Figure 6D:
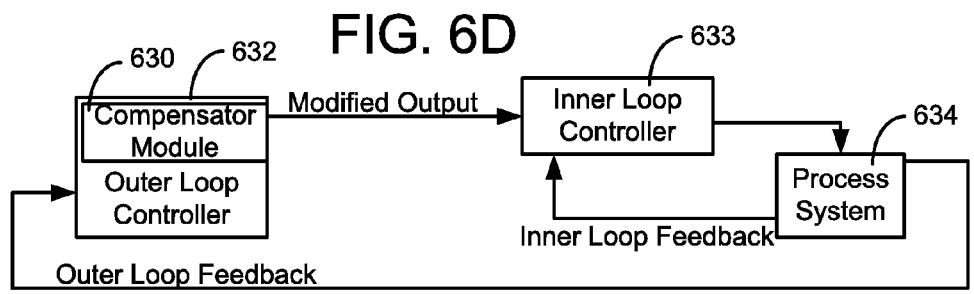

In FIG. 6D, compensator module 630 is shown as integrated with an outer loop controller 632 in a cascaded control strategy. As an example, the inner loop controller 633 may be configured to adjust an actuator of process system 634 that affects a damper position based on a fed back discharge air temperature entering a room (the inner loop feedback) and a room temperature setpoint provided by outer loop controller 630, where outer loop controller 630 adjusts the setpoint based on a measured room temperature (the outer loop feedback).

Figure 7:
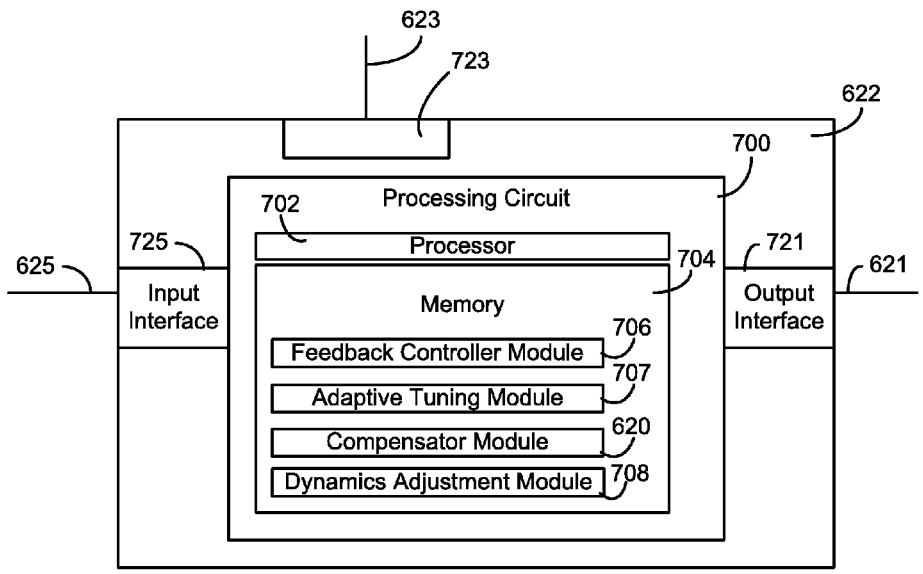
FIG. 7 is a detailed block diagram of the controller of FIG. 6C, according to an exemplary embodiment.

Referring now to FIG. 7, a more detailed block diagram of controller 622 of FIG. 6C is shown. In the embodiment of FIGS. 6C and 7, compensator module 620 is shown as a software module. In FIG. 7, controller 622 is shown to include a processing circuit 700 including a processor 702 and a memory 704. Processing circuit 700 and processor 702 are configured to receive inputs from input interfaces 723, 725 and communication links 623, 625 and to provide an output (e.g., a control signal, an actuator output, etc.) via output interface 721 and communication link 621. Processing circuit 700 can be a circuit containing one or more processing components (e.g., processor 702) or a group of distributed processing components. Processor 702 may be a general purpose or specific purpose processor configured to execute computer code or instructions stored in the memory or received from other computer readable media (e.g., CDROM, network storage, a remote server, etc.). Processing circuit 700 is also shown to include memory 704. Memory 704 may be RAM, hard drive storage, temporary storage, non-volatile memory, flash memory, optical memory, or any other suitable memory for storing software objects and/or computer instructions. When processor 702 executes instructions stored in memory 704 for completing the various activities described herein, processor 702 generally configures the computer system and more particularly processing circuit 700 to complete such activities. Memory 704 may include database components, object code components, script components, and/or any other type of information structure for supporting the various activities described in the present disclosure. For example, memory 704 may store data regarding the operation of a controller (e.g., previous setpoints, previous behavior patterns regarding used energy to adjust a current value to a setpoint, etc.). According to an exemplary embodiment, memory 704 is communicably connected to processor 702 and includes computer code for executing one or more processes described herein and processor 702 is configured to execute the computer code.

Memory 704 is shown to include feedback controller module 706. Feedback controller module 706 is the primary logic module configured to provide the feedback-based control activity of controller 622. In an exemplary embodiment, feedback controller module 706 is a PI control module. Feedback controller module 706 uses setpoint information from interface 723 and feedback information from input interface 725 to calculate or otherwise obtain the controlled variable. Adaptive tuning module 707 is configured to determine appropriate values of control parameters (e.g., proportional gain, integral gain, etc.). Adaptive tuning module 707 may tune control parameters based on a model reference adaptive control (MRAC) approach, a pattern recognition adaptive control (PRAC) approach, or another adaptive tuning approach or algorithm. Exemplary configurations and approaches of adaptive tuning module 707 are described in U.S. Pat. No. 5,355,305 and U.S. Pat. No. 6,937,909.

Compensator module 620 is integrated with controller 622 and is configured to receive the output from feedback controller module 706 that would normally be provided to output interface 621. Compensator module 620 is configured to modify the signal received from feedback controller module 706 by exaggerating the rate of change of the signal. Once the signal is modified according to the logic of compensator module 620, the compensator module 620 provides the modified output to output interface 721. It should be noted that transformations or other changes may occur after the modified signal leaves compensator module 620 but before the signal is outputted by output interface 721. For example, one or more filtering, modulating, or converting (e.g., digital to analog) processes may act on the modified signal to prepare the signal for transmission from controller 622 to process system 624.

Dynamics adjustment module 708 may be configured to adjust parameters of compensator module 620. In embodiments where compensator module 620 is configured to remove or adjust for dynamics of the process system, dynamics adjustment module 708 may be configured to use system or user inputs to update compensator parameters for changed process system dynamics. For example, in the exemplary compensation filter described above, as the time constant of the process system changes (e.g., due to time of day, time of year, actuator performance characteristics, sensor performance characteristics, etc.) the compensator's time constant $\tau$ may be adjusted and $\lambda$ may be recomputed. In other exemplary embodiments, $\lambda$ may initially be calculated once and then scaled up or down by dynamics adjustment module 708. As an example of how dynamics adjustment module 708 might be used, in a process system that relies on a temperature sensor, the temperature sensor may have a longer time constant when the temperature is relatively cold (e.g., below freezing). Dynamics adjustment module 708 may include logic to determine that the temperature has been below freezing for a period of time sufficient to be affecting the temperature sensor's time constant. A result of such determination may be to increase the compensator's time constant in proportion to the time constant increase of the temperature sensor and process system. Dynamics adjustment module 708 may be configured to determine when to adjust compensator dynamics (e.g., time constant, sampling period, etc.) based on models (e.g., a model of temperature response), pattern-based information from adaptive tuning module 707, historical information, sensor input, user input, or other inputs.

Further, dynamics adjustment module 708 may base compensator parameter control on equipment feedback characteristics or safety parameters. As $\lambda$ increases from zero to one, the loop will become more sensitive to disturbances because the compensator is more aggressively exaggerating the rate of change of the signal from the feedback controller. In exchange for the faster response to disturbances, equipment can wear faster and become more unstable. To protect against extreme instabilities or wear, dynamics adjustment module 708 may be configured to sense (e.g., via a vibration sensor, an optical sensor, a temperature sensor, etc.) indicators of equipment instabilities or wear. When the equipment is behaving too aggressively given the current compensator settings, the dynamics compensation module may adjust λ down or otherwise slow the compensator. In other embodiments of dynamics adjustment module 708, a measure of output signal volatility may be tracked and λ may be adjusted down as volatility reaches predetermined or calculated thresholds.

Figure 8:
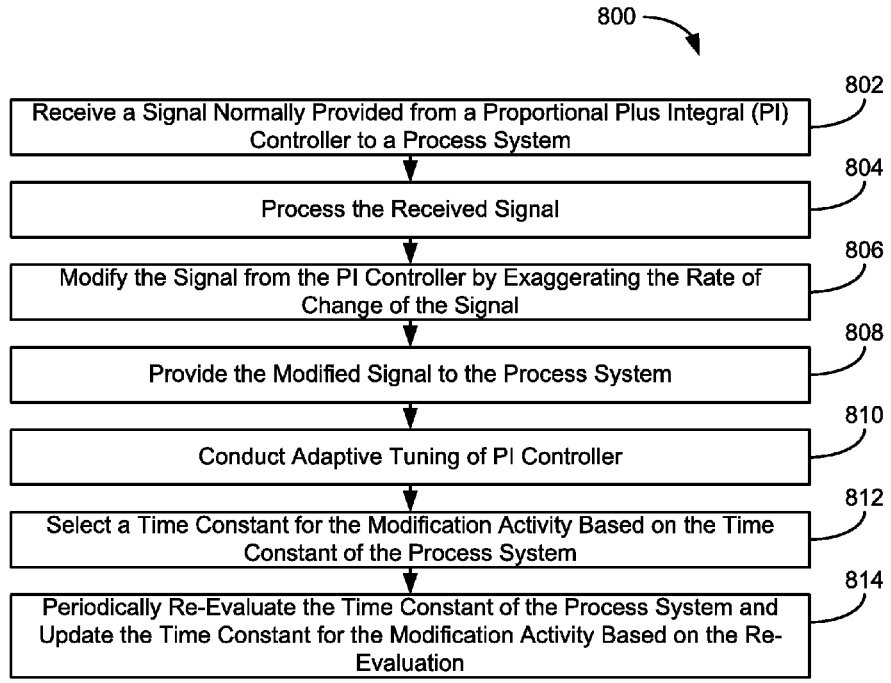
FIG. 8 is a flow chart of a process for adjusting a signal normally provided from a proportional plus integral (PI) controller to a process system.

Referring now to FIG. 8, a flow chart of a process 800 for adjusting a signal normally provided from a PI controller to a process system is shown, according to an exemplary embodiment. Process 800 is shown to include receiving the signal normally provided from the PI controller to the process system (step 802). Once received the signal can be evaluated or otherwise processed (step 804). The processing can include converting an analog signal to digital, separating the signal into frames for processing, conducting a filtering process on the signal to isolate frequencies of interest, or other processing tasks to prepare the signal for the modification of step 806. In step 806, process 800 includes modifying the signal from the PI controller by exaggerating the rate of change of the signal. This modification is completed by a compensator device or compensation module that is separate from the PI controller. In other words, the modification is not a part of the PI controller's feedback algorithm. In an exemplary embodiment the PI controller itself does not include derivative action or modify the signal based on the derivative term or other indicator of the rate of change.

Referring still to FIG. 8, process 800 further includes providing the modified signal to the process system (step 808). Providing the modified signal to the process system may include any number of post-processing activities (e.g., digital to analog conversion, signal amplification, modulation, etc.). In some embodiments the output to the process system will be via a wired connection or wired network. In other embodiments the output to the process system may be wireless (e.g., RF, optical, etc.).

It is contemplated that in parallel with the compensation activity the PI controller may also be adaptively tuned (step 810). For example, a PRAC controller may operate to tune the control parameters of the PI controller. Process 800 further includes selecting a time constant for the modification activity based on the time constant of the process system. As discussed above, the time constant for the modification activity may optimally be matched to or less than (e.g., half of) the time constant of the process system—depending on the particular process being controlled. The time constant may initially be hard-coded, entered by a user, or otherwise set in step 812. Process 800 further includes periodically re-evaluating the time constant of the process system and updating the time constant for the modification activity based on the re-evaluation (step 814). The re-evaluation may be completed based on a logic module and using sensor input, by evaluation of historical information for the process system or the feedback controller, conducted manually, or otherwise. The re-evaluation may be constant, randomly timed, or irregularly timed. In an exemplary embodiment the re-evaluation is completed by a rules engine configured to adjust the time constant of the modification activity based on rules established regarding the process system (e.g., time of year rules, temperature rules, process system operating state rules, etc.).

According to an exemplary embodiment, a PI controller and the described compensator is used in place of a PID controller or to simulate a PID controller. In one embodiment, the compensator as described herein is configured to simulate a PID controller by acting on the output of a PI controller. If a PID controller is represented using a proportional term $k_c$, an integral term $T_i$, and a derivative term $T_d$, the continuous-time form of a standard PID controller is:

$$G_{c,pid}(s) = k_c\left(1 + \frac{1}{T_i s} + T_d s\right)$$

$$= \frac{s^2 + \frac{1}{T_d}s + \frac{1}{T_i T_d}}{\frac{1}{T_d k_c}s}$$

$$= \frac{(s-a_1)(s-a_2)}{bs}.$$

The PID controller has two zeroes that are represented as $a_1$ and $a_2$, where $a_1$ and $a_2$ are values dependent upon the integral term $T$ and derivative term $T_d$ of the PID controller. The zeroes $a_1$ and $a_2$ can be solved for using the quadratic formula:

$$a_{[1,2]} = -\frac{1}{T_d} \pm \sqrt{\frac{1}{T_d^2} - 4\frac{1}{T_d T_i}}$$

$$= -\frac{1}{2T_d}\left(1 \pm \sqrt{1 - 4\frac{T_d}{T_i}}\right).$$

Therefore, the zeroes are real only when $4T_d \leq T_i$.

A PI controller in series with a compensator may be represented using a proportional term $k_{pi}$ and integral term $T_{pi}$ of the PI controller, a term of the compensator $T_x$, and a representation of the time constant of the compensator and process α. The PI controller in series with the compensator may be generally represented as:

$$G_{c,pi}(s)G_x(s) = \left(\frac{s + \frac{1}{T_{pi}}}{\frac{s}{k_{pi}}}\right)\left(\frac{s + \frac{1}{T_x}}{\alpha\left(s + \frac{1}{\alpha T_x}\right)}\right).$$

The zeroes of the above equations are $$\left\{-\frac{1}{T_i}; -\frac{1}{T_x}\right\}.$$

Therefore, the numerator of the above equation may be expanded to:

$$s^2 + \left(\frac{1}{T_{pi}} + \frac{1}{T_x}\right)s + \frac{1}{T_x T_{pi}}.$$

The numerator of the PID controller equation from above is:

$$s^2 + \frac{1}{T_d}s + \frac{1}{T_i T_d}.$$

Therefore, the coefficients of the numerators of the two equations may be equated. Equating the coefficients results in the following two equations that show an equivalence between the PID controller equation and the PI controller and compensator equation:

$$\frac{1}{T_d} = \frac{1}{T_{pi}} + \frac{1}{T_x} \text{ and}$$

$$\frac{1}{T_d T_i} = \frac{1}{T_{pi} T_x}.$$

Both equations may be solved for $T_{pi}$:

$$T_{pi} = \frac{T_i}{2}\left(1 \pm \sqrt{1 - 4\frac{T_d}{T_i}}\right).$$

In order for $T_{pi}$ to be real, the following condition has to hold: $4T_d \leq T_i$. Further, if $4T_d = T_i$, there is only one solution for $T_{pi}$:

$$T_{pi} = \frac{T_i}{2}.$$

The condition of $4T_d = T_i$ is met for certain PID controller tuning rules, (e.g., such as Ziegler-Nichols). Substituting back into other equations, it can be found that in this case, $T_x = 2T_d$, therefore illustrating an equivalence between the derivative term of the PID controller and a term of the compensator.

Most PID controllers include a first-order filter to smooth the feedback signal. The PID controller may thus be represented as:

$$G_{c,pid}(s) = \frac{s^2 + \frac{1}{T_d}s + \frac{1}{T_i T_d}}{\frac{\mu}{T_d k_c} s\left(s + \frac{1}{\mu}\right)}.$$

$\mu$ is the time constant of the smoothing filter included in the PID controller. The denominators of the above equation for the PID controller and for the PI controller and compensator may be equated to obtain the following relationships:

$$\alpha = \frac{\mu}{T_x} \text{ and}$$

$$k_{pi} = \frac{T_d}{T_x} k_c.$$

Therefore, the series combination of the PI controller and compensator is equivalent to a PID controller when the PID controller is tuned in a certain way (e.g., the Ziegler-Nichols tuning method described above). In an exemplary embodiment, the modification activity of the above-described compensator is configured to simulate a proportional-integral-derivative (PID) controller having the derivative logic in series with the PI logic.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A device for adjusting a signal normally provided by a proportional plus integral (PI) feedback control module to a process system, the device comprising:
    an input interface configured to receive the signal from the PI feedback control module;
    a processing circuit configured to modify the signal of the PI feedback control module by exaggerating the rate of change of the signal, wherein the processing circuit is configured to select a time constant for the modification based on the time constant of the process system; and
    an output interface for providing control signals to the process system;
    wherein the processing circuit is further configured to provide the modified signal to the output interface; and wherein the processing circuit is configured to periodically evaluate the time constant of the process system and to update the time constant for the modification based on the evaluation of the process system's time constant;

wherein the exaggeration is based on forward-looking predictions configured to compensate for dynamics of the process system;

wherein the processing circuit is configured to make the forward-looking predictions based on a calculated slope of the output of the PI feedback control module.

2. The device of claim 1, wherein the processing circuit includes the PI feedback control module.

3. The device of claim 1, wherein the PI feedback control module does not include derivative term control logic.

4. The device of claim 1, wherein the PI feedback control module includes derivative term control logic.

5. The device of claim 1, wherein the processing circuit further comprises an adaptive tuning module.

6. The device of claim 5, wherein the adaptive tuning module is configured to provide pattern recognition adaptive control (PRAC).

7. The device of claim 1, wherein the modification comprises amplifying a high frequency component of the signal relative to a low frequency component.

8. The device of claim 1, wherein the device is a digital controller.

9. A device for adjusting a signal normally provided by a proportional plus integral (PI) feedback control module to a process system, the device comprising:
- an input interface configured to receive the signal from the PI feedback control module;
- a processing circuit configured to modify the signal of the PI feedback control module by exaggerating the rate of change of the signal, wherein the processing circuit is configured to select a time constant for the modification based on the time constant of the process system; and
- an output interface for providing control signals to the process system;

wherein the processing circuit is further configured to provide the modified signal to the output interface; and wherein the processing circuit is configured to periodically evaluate the time constant of the process system and to update the time constant for the modification based on the evaluation of the process system's time constant;

wherein the device and the processing circuit are not physically integrated with the PI feedback control module.

10. A control system for a plant, comprising:
- a feedback controller configured to calculate a control signal for the plant based on a feedback signal; and
- a compensator configured to intercept the control signal, to modify the control signal by exaggerating the rate of change of the control signal, and to provide the modified control signal to the plant, wherein the compensator is configured to select a time constant for the modification based on the time constant of the process system, and wherein the compensator is further configured to periodically evaluate the time constant of the process system and to update the time constant for the modification based on the periodic evaluation of the process system's time constant wherein the feedback controller is an adaptive proportional plus integral (PI)-type feedback controller; and wherein the compensator is configured to simulate an adaptive proportional-integral-derivative (PID) type feedback controller via the modification of the control signal from the PI-type feedback controller.

11. The control system of claim 10, wherein the compensator is physically separate from the feedback controller.

12. The control system of claim 10, wherein the compensator is integrated with the feedback controller.

13. The control system of claim 10, further comprising:
- computer-readable media with computer-executable instructions embodied thereon that when executed by a computing system configures the computing system to provide the feedback controller and the compensator.

* * * * *